United States Patent
Mandic et al.

(10) Patent No.: US 10,877,945 B1
(45) Date of Patent: Dec. 29, 2020

(54) OPTIMIZED BLOCK STORAGE FOR CHANGE BLOCK TRACKING SYSTEMS

(71) Applicant: EMC IP Holding Company LLC, Hopkinton, MA (US)

(72) Inventors: Vladimir Mandic, San Jose, CA (US); Vijay C. Madhavapeddi, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 214 days.

(21) Appl. No.: 14/137,768

(22) Filed: Dec. 20, 2013

(51) Int. Cl.
*G06F 16/21* (2019.01)

(52) U.S. Cl.
CPC .................. *G06F 16/21* (2019.01)

(58) Field of Classification Search
CPC ........................................ G06F 16/21
See application file for complete search history.

(56) References Cited

U.S. PATENT DOCUMENTS

| | | | | |
|---|---|---|---|---|
| 8,074,043 B1* | 12/2011 | Zeis | ................ | G06F 16/1748 711/171 |
| 8,539,148 B1* | 9/2013 | Chen | ................ | G06F 3/0608 711/112 |
| 8,898,114 B1* | 11/2014 | Feathergill | ........ | G06F 17/30159 707/648 |
| 9,037,547 B1* | 5/2015 | Shivdeo | ............ | G06F 17/30575 707/664 |
| 2008/0013830 A1* | 1/2008 | Patterson | ............ | G06F 11/1451 382/173 |
| 2009/0132619 A1* | 5/2009 | Arakawa | ............... | G06F 3/0605 |
| 2010/0077013 A1* | 3/2010 | Clements | .......... | G06F 17/30156 707/822 |
| 2010/0121825 A1* | 5/2010 | Bates | ................ | G06F 17/30156 707/692 |
| 2010/0198797 A1* | 8/2010 | Wideman | ............ | G06F 16/1748 707/692 |
| 2010/0332454 A1* | 12/2010 | Prahlad | ............. | G06F 17/30082 707/654 |
| 2011/0082840 A1* | 4/2011 | Jayaraman | ........ | G06F 17/30156 707/692 |
| 2011/0099154 A1* | 4/2011 | Maydew | ........... | G06F 17/30156 707/692 |
| 2011/0125720 A1* | 5/2011 | Jayaraman | ........ | G06F 17/30156 707/692 |
| 2011/0184908 A1* | 7/2011 | Slater | .................. | G06F 11/1453 707/609 |
| 2012/0150826 A1* | 6/2012 | Vijayan Retnamma | ..................... | G06F 17/30312 707/692 |
| 2013/0282669 A1* | 10/2013 | Fiske | .................... | G06F 3/0641 707/692 |

(Continued)

FOREIGN PATENT DOCUMENTS

CN 102156727 A * 8/2011

*Primary Examiner* — Alford W Kindred
*Assistant Examiner* — Lin Lin M Htay
(74) *Attorney, Agent, or Firm* — Van Pelt, Yi & James LLP (57) ABSTRACT

A system for backup comprises an input interface configured to receive a request to back up a file. The system for backup additionally comprises a processor configured to determine whether the file comprises an indicator to back up without deduplication, and in the event the file comprises an indicator to back up without deduplication, process the file for deduplication storage without deduplication.

29 Claims, 6 Drawing Sheets (56) References Cited

U.S. PATENT DOCUMENTS

2014/0143213 A1* 5/2014 Tal .................... G06F 17/30156
707/692
2014/0244599 A1* 8/2014 Zhang .................. G06F 3/0608
707/692

* cited by examiner

FIG. 6

US 10,877,945 B1

OPTIMIZED BLOCK STORAGE FOR CHANGE BLOCK TRACKING SYSTEMS

BACKGROUND OF THE INVENTION

Traditional deduplication methods are efficient in identifying duplicate blocks within reoccurring data patterns and achieve highest deduplication rates on repeated backups. However, new, highly intelligent backup applications are able to identify uniquely changed blocks at the time of the backup and avoid sending duplicate copies to the backup server. The pattern of data transfer is thus such that deduplication efficiency is significantly reduced. As a result, the computing cost of deduplication can outweigh the savings resulting from it.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Optimized block storage for change block tracking systems is disclosed. A system for backup comprises an input interface configured to receive a request to back up a file. The system for backup additionally comprises a processor configured to determine whether the file comprises an indicator to back up without deduplication, and in the event the file comprises an indicator to back up without deduplication, process the file for deduplication storage without deduplication. The system for backup additionally comprises a memory coupled to the processor and configured to provide the processor with instructions.

In some embodiments, use of a deduplicating storage system with a backup application that performs change block tracking can be inefficient. The backup application performs a deduplication-like function, leaving little gain to be achieved by the deduplicating storage system. The possible gains of deduplication are then outweighed by the processing necessary to calculate the deduplication hashes. It is still desirable to use the deduplicating storage system, however, due to its powerful functionality. In various embodiments, the functionality comprises: fast copying of a file locally (e.g., the file's hashes are quickly copied and reference counts for the blocks is incremented. Actual file data is not copied and hence it's very fast); inserting data into/deleting data from the middle of a file (e.g., a sequence of hashes is inserted/deleted in the middle of the original hash sequence for this file-actual file data is left untouched and is not even contiguous after the first change); synthesizing a file from parts of another file (e.g., a regular file can be converted into a format (like NetWorker savestream which is ideal for tapes) that requires headers and other metadata to be placed at regular intervals inside the file—this is done by taking the original file, chopping it up into N pieces, constructing the new file in the format by juxstaposing the pieces together with the metadata inserted before each piece.). A deduplicating storage system including optimized block storage for change block tracking systems looks for a "no deduplication" indicator associated with a received data chunk. A backup application with change block tracking associates the "no deduplication" indicator with a transmitted data block to indicate that the data block only comprises new data and should not be deduplicated (e.g., because it is unlikely to achieve significant compression). When the deduplicating storage system receives a data chunk with the associated no deduplication indicator, rather than calculating a data fingerprint of the chunk by performing a hash function, it simply generates a new globally unique identifier (e.g., a GUID) to serve as the data fingerprint. In some embodiments, the GUID is generated serially, e.g., by adding an increment to the previously assigned GUID. In some embodiments, the data chunk is segmented without using calculation intensive methods (e.g., fixed length segmenting, pattern identification, etc.) and each segment is assigned a GUID and metadata is stored indicating that the data chunk is reconstructed using a sequence of segments by storing the associated GUIDs of each segment of the sequence of segments.

In some embodiments, the GUID includes metadata inside of itself (e.g., device identifier that generated the GUID, indicator that the GUID was not calculated using a hashing algorithm, indicator that the GUID is for a file that is not deduplicated, indicator that the file is a null segment, etc.).

In some embodiments, recovery of a file or block that was stored without deduplication from the deduplication system uses the GUID or a sequence of GUIDs to retrieve and, if needed, to reconstruct the file or block.

In various embodiments, a GUID is selected from a set of identifiers, selected from identifiers in a range of identifiers, randomly selected from within the set of identifiers, incremented from a previously selected identifier (e.g., from a starting identifier or a last identifier), or any other appropriate selection of an identifier. In various embodiments, the GUID indicates that the stored file or block or segment associated with the GUID is stored with deduplication, is stored without deduplication, is a null file, or any other appropriate indication.

Figure 1:
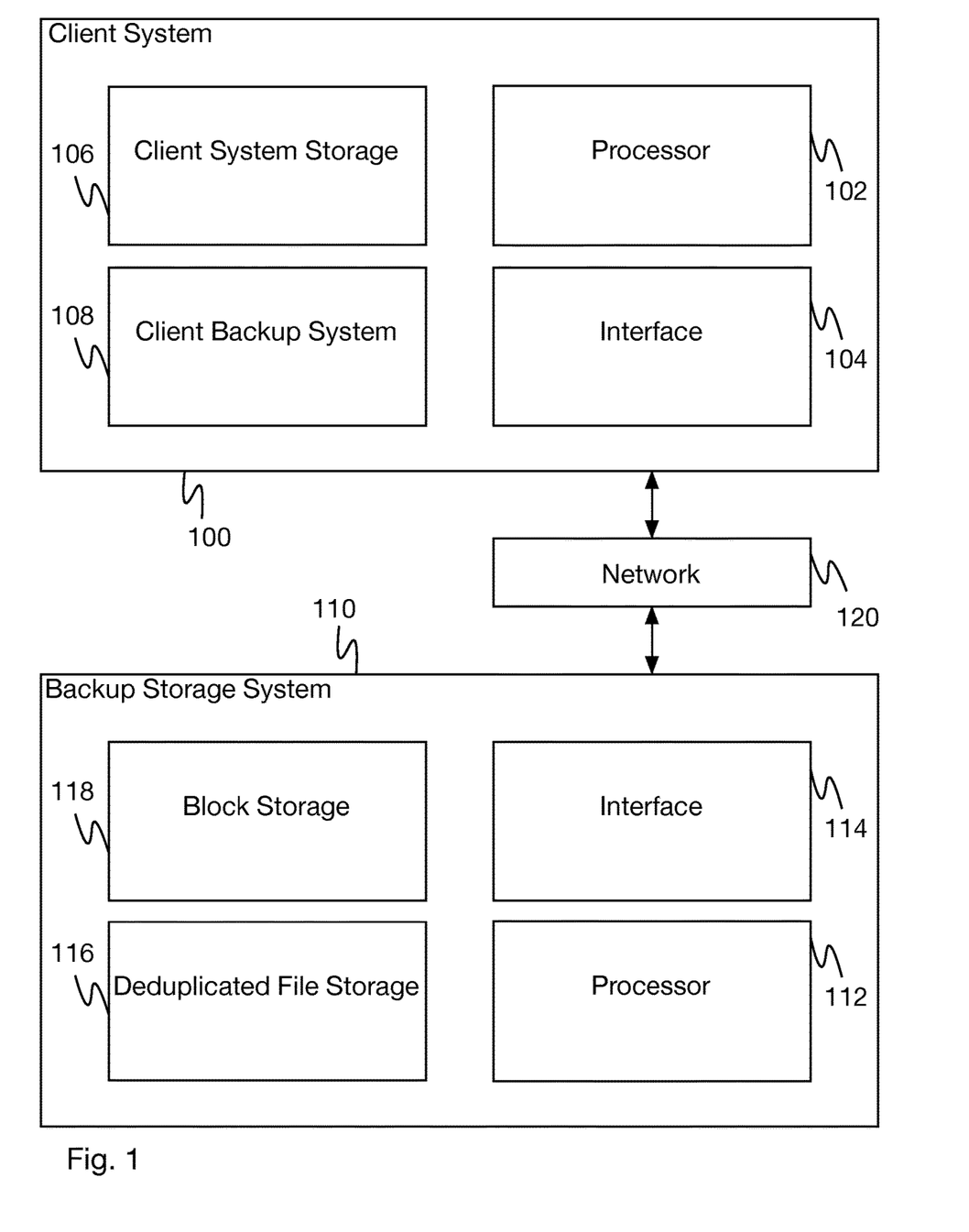
FIG. 1 is a block diagram illustrating an embodiment of a system for optimized block storage for change block tracking systems.

FIG. 1 is a block diagram illustrating an embodiment of a system for optimized block storage for change block tracking systems. In the example shown, the system for optimized block storage for change block tracking systems comprises client system 100 communicating with backup storage system 110. In some embodiments, client system 100 communicates with backup storage system 110 via network 120. In various embodiments, network 120 comprises one or more of the following: a local area network, a wide area network, a wired network, a wireless network, the Internet, an intranet, a storage area network, or any other appropriate communication network. Client system 100 comprises a client system (e.g., a computing system for operation by a user). In some embodiments, client system 100 comprises a system accessed by a user directly (e.g., the user is in proximity with client system 100). In some embodiments, client system 100 comprises a system accessed by a user remotely (e.g., the user is not in proximity with client system 100, and accesses client system 100 via network 120 and a separate user system). Client system 100 comprises a system running enterprise software (e.g., business software for creating data, storing data, transmitting data, receiving data, etc.) using processor 102. Client system 100 communicates with network 120 using interface 104 and stores data using client system storage 106. In some embodiments, client backup system 108 comprises a system for storing data on a backup system or retrieving stored data from a backup system. In some embodiments, client backup system 108 comprises software running on processor 102. Backup storage system 110 comprises a computer system for backing up data. In some embodiments, backup storage system 110 comprises a computer system for storing deduplicated data. In some embodiments, deduplicated data comprises data processed in such a way that multiple copies of the same data are only stored once. In some embodiments, backup storage system 110 comprises a system for storing backup copies of data (e.g., a system for storing backup copies of data from client system 100). Processor 112 comprises a processor for controlling operations of backup storage system 110. Interface 114 comprises a system for communicating with network 120. Backup storage system 110 additionally comprises deduplicated file storage 116 for storing deduplicated data and block storage 118 for storing block data (e.g., data blocks that have not been processed by deduplication). In various embodiments, deduplicated file storage 116 and block storage 118 comprise separate directories within a disk partition, separate partitions within a disk, separate disks, separate storage systems, or any other appropriate division. In some embodiments, block storage 118 and deduplicated file storage 116 are the same storage and the block storage and deduplicated file storage is intertwined.

Figure 2:
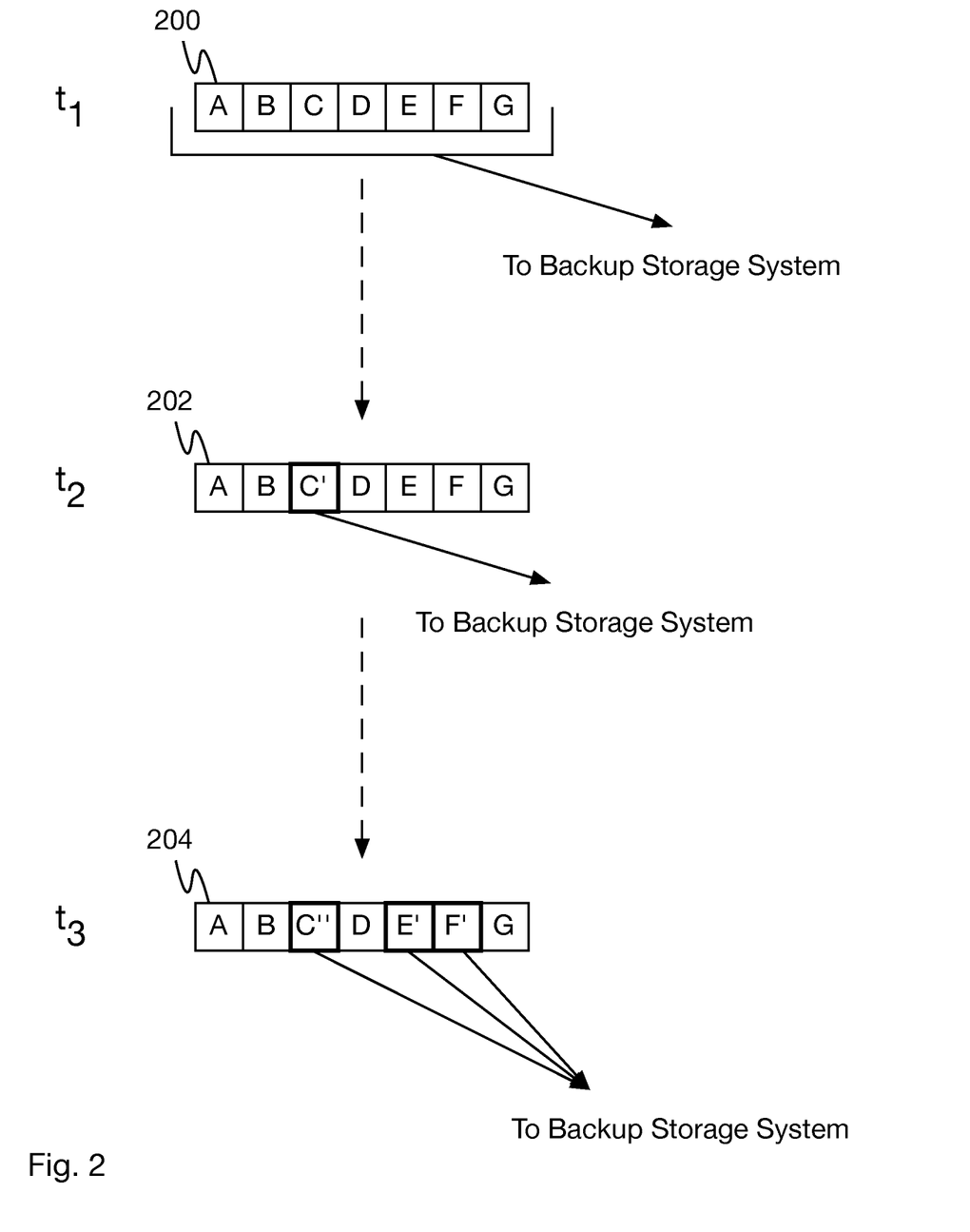
FIG. 2 is a diagram illustrating an embodiment of the operation of a change block tracking system.

FIG. 2 is a diagram illustrating an embodiment of the operation of a change block tracking system. In some embodiments, the change block tracking system is running on a client system (e.g., client system 100 of FIG. 1). In the example shown, data blocks 200 comprise a set of data blocks at a time t1. At time t1, the data has not been previously backed up, and the change block tracking system creates a full backup. Creating a full backup comprises the change block tracking system sending all data blocks (e.g., data block A, data block B, data block C, data block D, data block E, data block F, and data block G) to the backup storage system. In some embodiments, when a full backup is processed, there is a likelihood of significant compression by deduplicating the backup. In some embodiments, when data blocks comprising a full backup are sent to the backup storage system, an indication is made to process the data blocks with deduplication. In some embodiments, making an indication to process data blocks with deduplication comprises not making an indication to process data blocks without deduplication. When data blocks 200 are sent to the backup system, they are sent with an indication to process them with deduplication. Data blocks 202 comprise a set of data blocks at time t2 (e.g., at a later time than time t1). Data blocks 202 comprise data blocks 200 after time has passed. At time t2, data block A, data block B, data block D, data block E, data block F, and data block G are unchanged since time t1. Data block C has changed to data block C'. The change block tracking system performs an incremental backup, sending only block C' to the backup system. When only blocks with new data are sent to the backup system, the expected efficiency gains of deduplication are low. In some embodiments, when only blocks with new data are sent to the backup system, an indication is made to process the data blocks without deduplication (e.g., in order to avoid wasting processing power for little benefit). In the example shown, when data block C' is sent to the backup system, it is sent with an indication not to process it with deduplication. Data blocks 204 comprise a set of data blocks at time t3 (e.g., at a later time than time t2). In some embodiments, data blocks 204 comprise data blocks 202 after time has passed. At time t3, data block A, data block B, data block D, and data block G are unchanged from time t2, and data block C' has changed to data block C'', data block E has changed to data block E', and data block F has changed to data block F'. The change block tracking system performs an incremental backup, sending only blocks C'', E', and F' to the backup system. When data blocks C'', E', and F' are sent to the backup system, they are sent with an indication to process them without deduplication.

Figure 3:
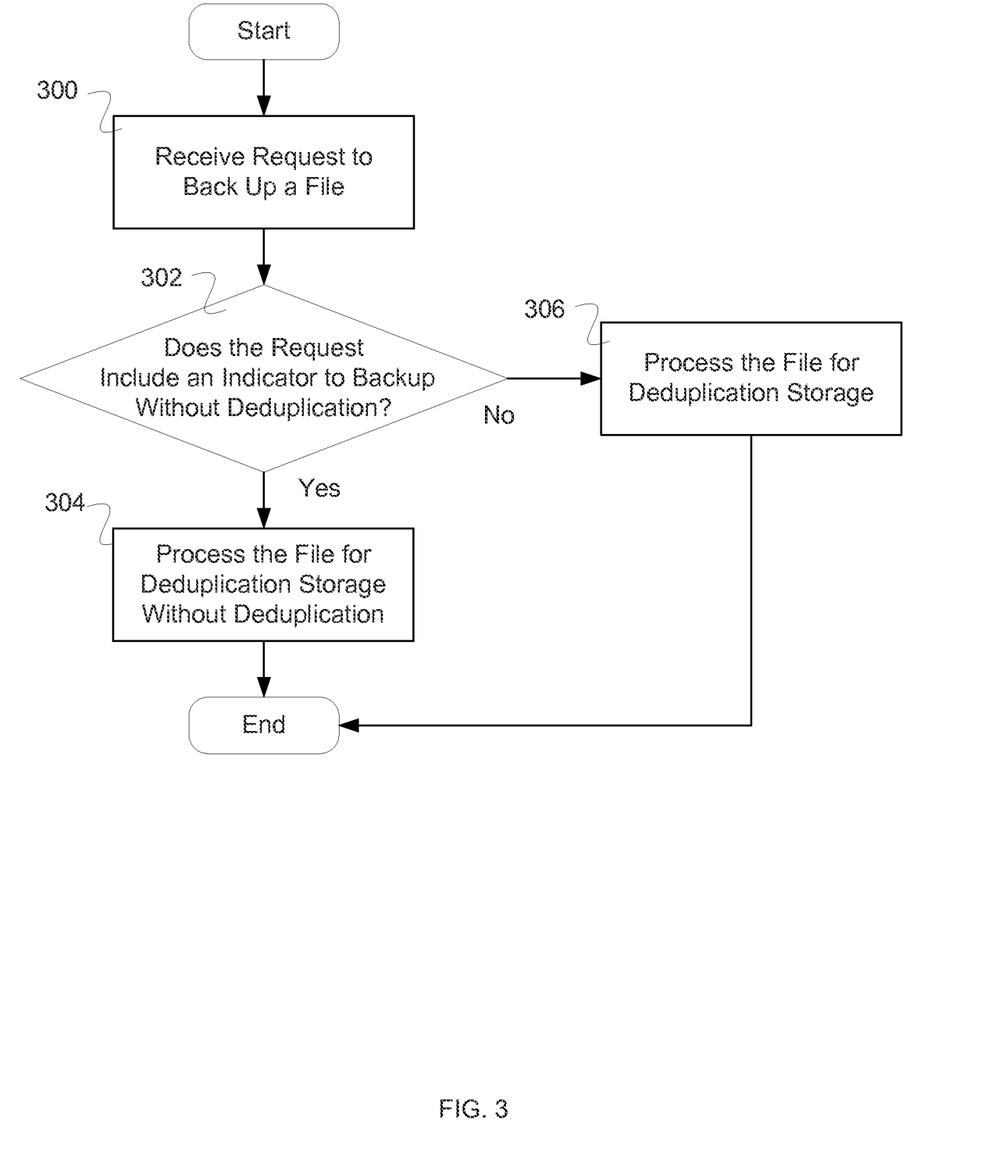
FIG. 3 is a flow diagram illustrating an embodiment of a process for backing up data.

FIG. 3 is a flow diagram illustrating an embodiment of a process for backing up data. In some embodiments, the process of FIG. 3 is executed by backup storage system 110 of FIG. 1. In the example shown, in 300, a request to back up a file is received. For example, a file comprising a data file or a data block is received from a client. In some embodiments, the request to back up a file is received from a client system. In some embodiments, a request to back up a file comprises the file. In 302, it is determined whether the file includes an indicator to back up without deduplication. If it is determined that the file includes an indicator to back up without deduplication, control passes to 304. In 304, the file is processed for deduplication storage without deduplication. For example, the file is stored in a deduplication storage system but without deduplication processing to save on computation (e.g., the file is stored with simple segmenting, if appropriate, and simple identifier assigned to the block). This enables the system to efficiently store files where deduplication processing is unlikely to yield any storage efficiency so that simply storing the file saves processing. In some embodiments, an associated global unique identifier is determined. For example, an incremented identifier number. In some embodiments, the global unique identifier includes a designation of a null segment. In some embodiments, the global unique identifier is within a range of numbers that indicates that the identifier is associated with a file that is stored without deduplication. In some embodiments, the global unique identifier is within a range of numbers that indicates that the file is a null segment.

In the event that it is determined that file does not include an indicator to back up without deduplication, control passes to 306. In 306, the file is process for deduplication storage. For example, the file is segmented and for each segment an identifier is determined (e.g., a fingerprint or hash of the content is calculated). The identifier is used to determine whether the segment has been previously stored. In the event that the segment has been previously stored a reference is to the previous stored segment is used for the storage and reconstruction of the file. In the event that the segment has not been previously stored, the segment is stored with an associated identifier. A metadata mapping is stored indicating segments required to reconstruct the file.

Figure 4:
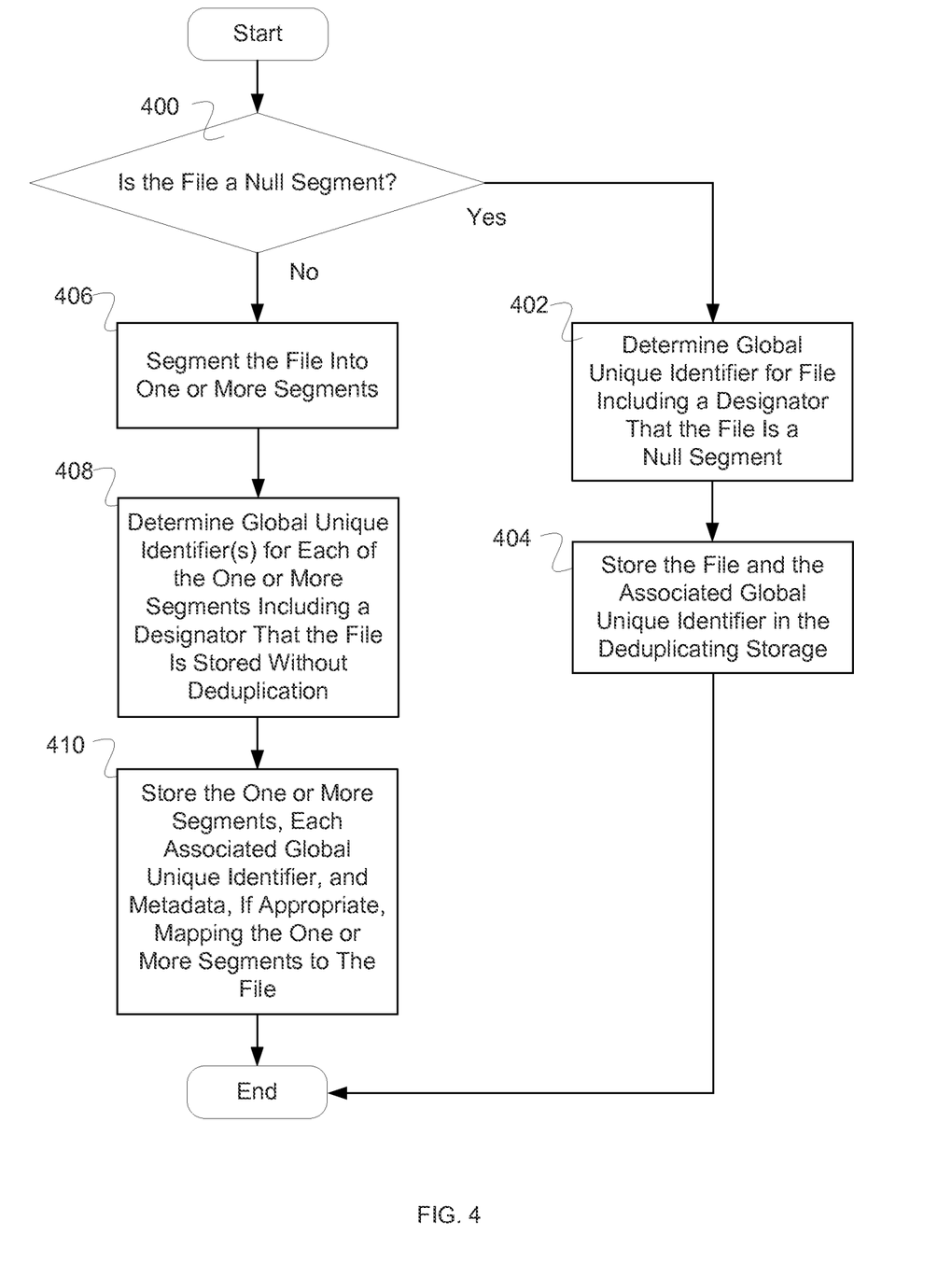
FIG. 4 is a flow diagram illustrating an embodiment of a process for storing a file without deduplication.

FIG. 4 is a flow diagram illustrating an embodiment of a process for storing a file without deduplication. In some embodiments, the process of FIG. 4 is used to implement 304 of FIG. 3. In the example shown, in 400 it is determined whether the file is a null segment. In the event that the file is a null segment, in 402 a global unique identifier is determined for the file including a designator that the file is a null segment. In 404, the file and the associated global unique identifier is stored in the deduplicating storage. In the event that the file is not a null segment, then in 406 the file is segmented into one or more segments. For example, the file is chopped based on byte count. In some embodiments, the file is not segmented in the event that the file is below a threshold length. In 408, a global unique identifier is determined for each of the one or more segments. For example, a global unique identifier is selected in a range, from a set of values, by incrementing a prior identifier, or any other appropriate way of selecting an identifier. In some embodiments, the range or set associated with the identifier indicates that the segment is stored without deduplication on the deduplicating storage. In 410, the one or more segments, each associated global unique identifier, and metadata, if appropriate, mapping the one or more segments to the file are stored.

Figure 5:
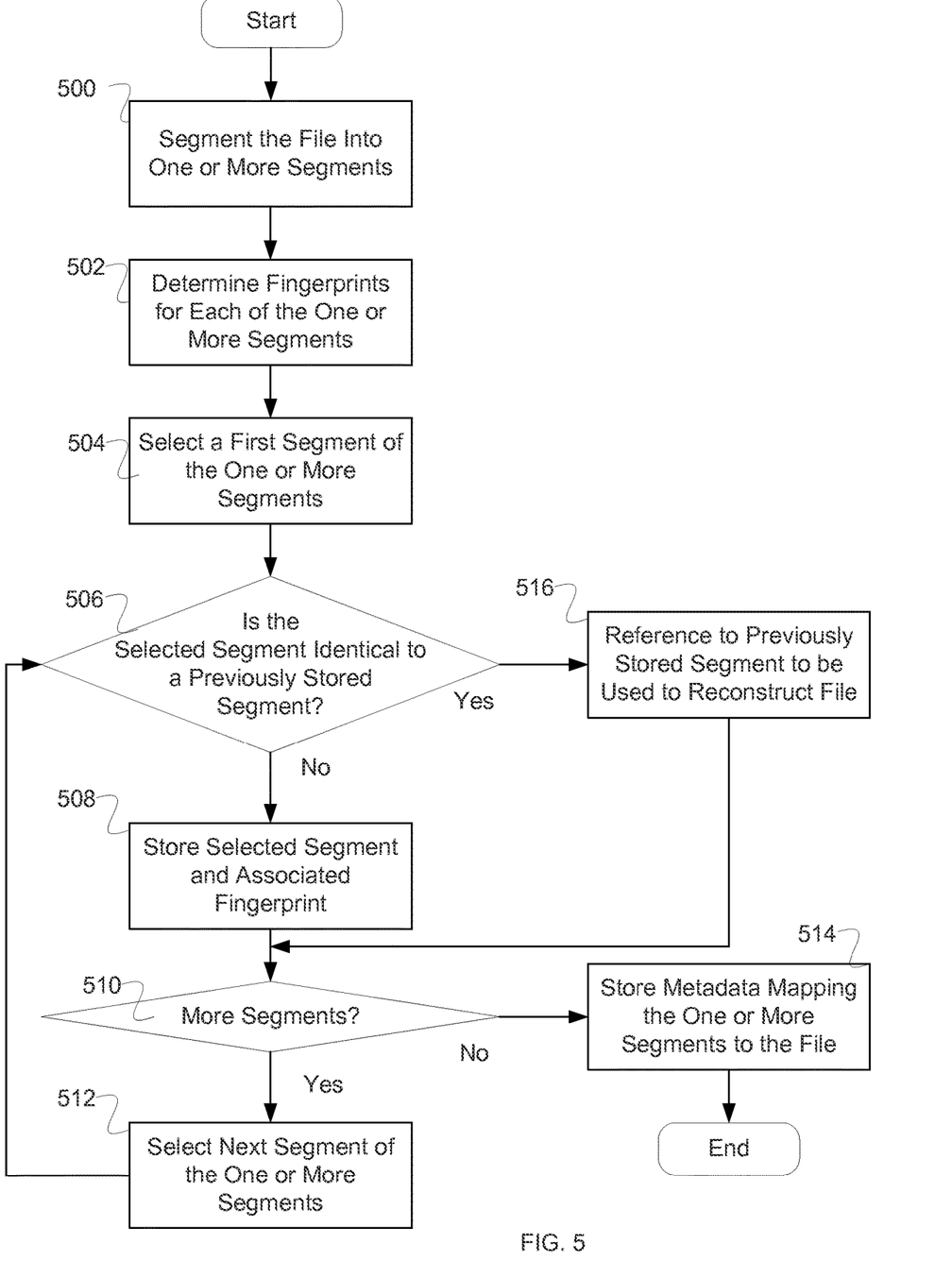
FIG. 5 is a flow diagram illustrating an embodiment of a process for storing a file with deduplication.

FIG. 5 is a flow diagram illustrating an embodiment of a process for storing a file with deduplication. In some embodiments, the process of FIG. 5 is used to implement 306 of FIG. 3. In the example shown, in 500 the file is segmented into one or more segments. For example, a hash function is run for a sliding window along the content data of the file. When the hash function hits a value or other criterion such as a maximum or minimum within a range of lengths from another segment boundary, then a new segment boundary is designated. In 502, fingerprints are determined for each of the one or more segments. For example, a hash is taken of the content of the segment and the resulting value is used as an identifier or fingerprint of the segment. In 504, a first segment is selected of the one or more segments. In 506, it is determined whether the selected segment is identical to a previously stored segment. For example, the fingerprint of the new segment is compared to the fingerprints of previously stored segments. In the event that the fingerprints match, then it is determined that the selected segment is identical to a previously stored segment. In the event that it is determined that the selected segment is identical to a previously stored segment, then in 516 a reference to the previously stored segment is used to reconstruct the file. In the event that it is determined that the selected segment is not identical to a previously stored segment, then in 508 the selected segment and an associated fingerprint are stored. In 510, it is determined whether there are more segments. In the event that there are more segments, in 512 a next segment is selected of the one or more segments, and control passes to 506. In the event that there are no more segments, then in 514 metadata mapping the one or more segments to the file are stored. For example, a list of identifiers (e.g., the fingerprints) is stored for each file. The fingerprints point to the segments needed to reconstruct the file and the list designates the order of the segments for reconstructing the file.

Figure 6:
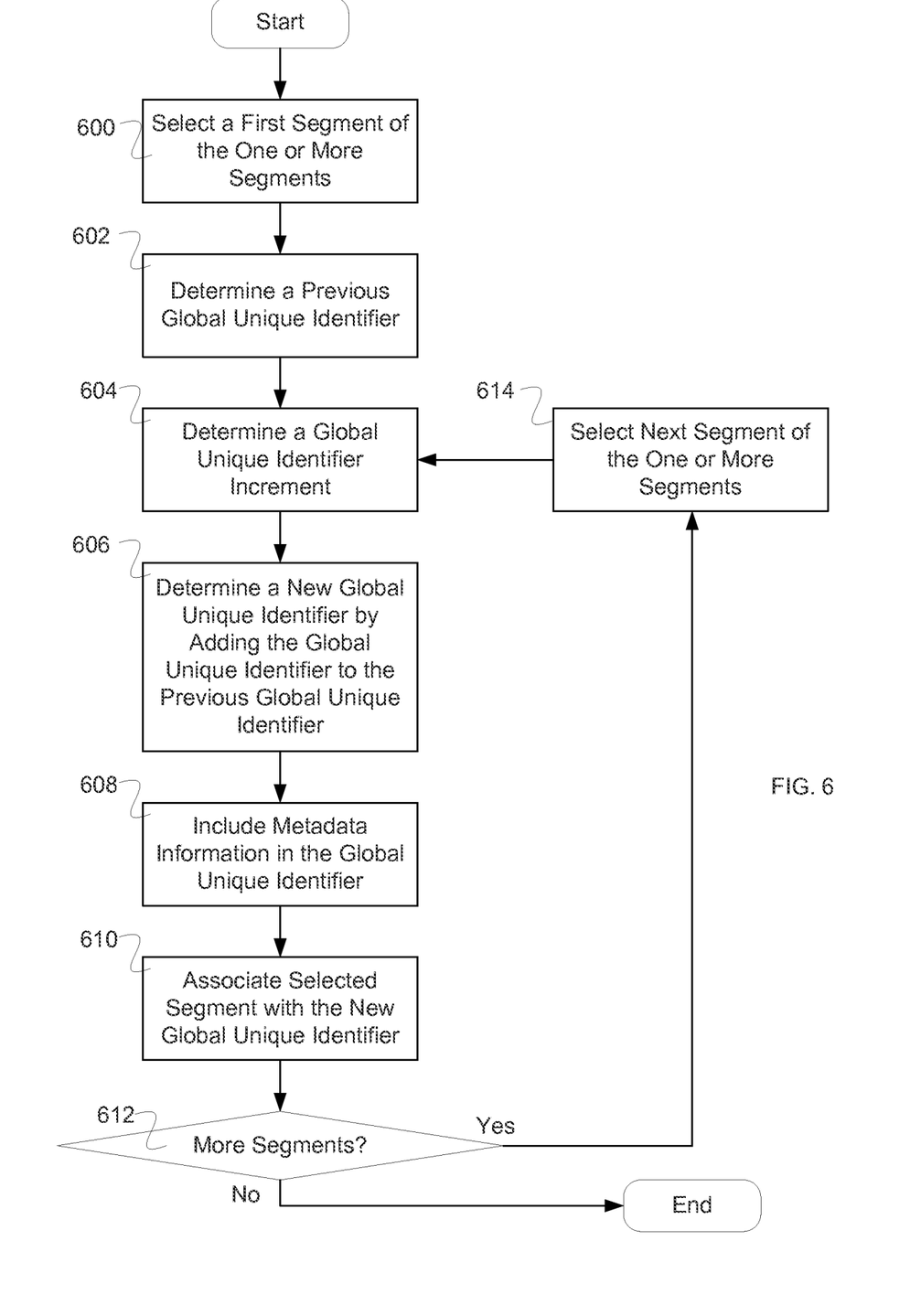
FIG. 6 is a flow diagram illustrating an embodiment of a process for determining a global unique identifier.

FIG. 6 is a flow diagram illustrating an embodiment of a process for determining a global unique identifier. In some embodiments, the process of FIG. 6 implements 408 of FIG. 4. In the example shown, in 600, a first segment of the one or more segments is selected. In 602, a previous global unique identifier is determined. In various embodiments, a previous global unique identifier comprises the previous determined global unique identifier, the previous determined global unique identifier of a given category, a randomly determined global unique identifier, a first global unique identifier, or any other appropriate global unique identifier. In 604, a global unique identifier increment is determined. In various embodiments, a global unique identifier increment comprises a stored value of a global unique identifier increment, a randomly determined global unique identifier increment, the value 1, or any other appropriate global unique identifier increment. In 606, a new global unique identifier is determined by adding the global unique identifier increment to the previous global unique identifier. In 608, metadata information is included in the global unique identifier. For example, bits identifying the creator of the global unique identifier and bits indicating that the segment associated with the identifier is stored without deduplication are included in the global unique identifier (e.g., the top bits of the GUID store a device or server ID and an indicator that the segment is stored without deduplication). In 610, the selected segment (e.g., a data block or portion of a data block) is associated with the new global unique identifier. In some embodiments, associating the segment with the new global unique identifier comprises storing the new global unique identifier as part of header for the segment in the deduplicating storage. In 612, it is determined whether there are more segments. In the event that there are more segments, in 614, a next segment is selected from the one or more segments and control passes to 604. In the event that there are no more segments, the process ends.

In various embodiments, a global unique identifier is selected from a set of identifiers, identifiers in a range of identifiers, randomly selected from within the set of identifiers, or any other appropriate selection of an identifier.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for backup, comprising:
   an input interface configured to receive a request to back up a file; and a processor configured to:
in response to receiving the request to back up the file, determine whether use deduplication in connection with backing up the file, wherein to determine whether to use deduplication comprises to determine whether the file comprises an indicator that indicates that the file is to be backed up without deduplication, wherein the indicator that indicates that the file is to be backed up without deduplication is associated with the file based on a determination of whether the file is to be backed up without deduplication, and wherein the indicator is set with respect to the file to indicate that the file is to be backed up without deduplication based at least in part on a determination of whether corresponding blocks comprise only new data;
if the file comprises the indicator to back up without deduplication,
process the file for deduplication storage without deduplication, including obtaining a unique identifier associated with the file and associating the unique identifier with the file, wherein association of the unique identifier with the file indicates that the file is stored without deduplication; and
if the file does not comprise the indicator to back up without deduplication,
process the file for deduplication storage with deduplication, including obtaining a finger print associated with the file by performing a hash function.

2. The system of claim 1, wherein the file comprises a data file or a data block.

3. The system of claim 1, wherein processing the file for deduplication storage without deduplication comprises determining whether the file comprises a null file.

4. The system of claim 3, wherein processing the file for deduplication storage without deduplication comprises determining a global unique identifier in the event that the file comprises the null file.

5. The system of claim 4, wherein processing the file for deduplication storage without deduplication comprises storing the file and the global unique identifier in the deduplicating storage.

6. The system of claim 1, wherein processing the file for deduplication storage without deduplication comprises segmenting the file into one or more segments in the event that the file does not comprise a null file.

7. The system of claim 6, wherein obtaining the unique identifier associated with the file comprises determining one or more global unique identifiers for each of the one or more segments.

8. The system of claim 7, wherein processing the file for deduplication storage without deduplication comprises storing the one or more segments and the one or more global unique identifiers associated with each of the one or more segments.

9. The system of claim 8, wherein processing the file for deduplication storage without deduplication comprises storing a metadata mapping, wherein the metadata mapping maps the one or more segments to the file.

10. The system of claim 1, wherein processing the file for deduplication storage without deduplication comprises using one or more global unique identifiers associated with the file.

11. The system of claim 10, wherein one of the one or more globally unique identifiers is selected from a set of identifiers.

12. The system of claim 10, wherein one of the one or more globally unique identifiers is selected a range of identifiers.

13. The system of claim 10, wherein one of the one or more globally unique identifiers is selected randomly from within a set of identifiers.

14. The system of claim 10, wherein one of the one or more globally unique identifiers is incremented from a previously selected identifier.

15. The system of claim 10, wherein one of the one or more globally unique identifiers indicates that the file is stored with deduplication.

16. The system of claim 10, wherein one of the one or more globally unique identifiers indicates that the file is stored without deduplication.

17. The system of claim 10, wherein one of the one or more globally unique identifiers indicates that the file is a null file.

18. The system of claim 1, wherein the file comprises the indicator to backup without deduplication in response to a determination that the file corresponds to one or more blocks with new data.

19. The system of claim 1, wherein the unique identifier associated with the file is used to determine whether at least part of the file has been previously stored.

20. The system of claim 1, wherein to determine whether the file comprises the indicator to backup without deduplication does not require computing a finger print of the file.

21. The system of claim 1, wherein the indicator does not correspond to a finger print of the file.

22. The system of claim 1, wherein the unique identifier is globally unique and the unique identifier is obtained in a manner that is different from a manner in which the finger print for association with a file to be deduplicated is obtained.

23. The method of claim 1, wherein in response to determining that the file comprises the indicator, the file is processed for deduplication storage without computing a finger print associated with the file.

24. The method of claim 1, wherein a file comprising only new data further comprises the indicator to backup without deduplication.

25. A method for backup, comprising:
receiving a request to back up a file;
in response to receiving the request to back up the file, determining whether use deduplication in connection with backing up the file, wherein to determine whether to use deduplication comprises determining whether the file comprises an indicator that indicates that the file is to be backed up without deduplication, wherein the indicator that indicates that the file is to be backed up without deduplication is associated with the file based on a determination of whether the file is to be backed up without deduplication, and wherein the indicator is set with respect to the file to indicate that the file is to be backed up without deduplication based at least in part on a determination of whether corresponding blocks comprise only new data;
if the file comprises the indicator to back up without deduplication, processing the file for deduplication storage without deduplication, including obtaining a unique identifier associated with the file and associating the unique identifier with the file, wherein association of the unique identifier with the file indicates that the file is stored without deduplication; and
if the file does not comprise the indicator to back up without deduplication, processing the file for deduplication storage with deduplication, including obtaining a finger print associated with the file by performing a hash function.

26. The method of claim 25, further comprising:
in response to receiving a request to recover the file, using the unique identifier associated with the file to reconstruct the file.

27. The method of claim 25, further comprising:
determining whether to associate the indicator with the file, the indicator being indicative of whether the file is to be backed up without deduplication; and
in response to determining that the indicator that indicates that the file is to backed up without deduplication, associating the indicator with the file.

28. The method of claim 27, wherein the determining whether to associate the indicator with the file is based at least in part on a determination of an extent of new data comprised in the file.

29. A computer program product for backup, the computer program product being embodied in a non-transitory tangible computer readable storage medium and comprising computer instructions for:
receiving a request to back up a file;
in response to receiving the request to back up the file, determining whether use deduplication in connection with backing up the file, wherein to determine whether to use deduplication comprises determining whether the file comprises an indicator that indicates that the file is to backed up without deduplication, wherein the indicator that indicates that the file is to be backed up without deduplication is associated with the file based on a determination of whether the file is to be backed up without deduplication, and wherein the indicator is set with respect to the file to indicate that the file is to be backed up without deduplication based at least in part on a determination of whether corresponding blocks comprise only new data;
if the file comprises the indicator to back up without deduplication, processing the file for deduplication storage without deduplication, including obtaining a unique identifier associated with the file and associating the unique identifier with the file, wherein association of the unique identifier with the file indicates that the file is stored without deduplication; and
if the file does not comprise the indicator to back up without deduplication, processing the file for deduplication storage with deduplication, including obtaining a finger print associated with the file by performing a hash function.

* * * * *